United States Patent

[11] 3,633,976

[72] Inventor Jan Kruyer
 Edmonton, Alberta, Canada
[21] Appl. No. 91,487
[22] Filed Nov. 20, 1970
[45] Patented Jan. 11, 1972
[73] Assignee Research Council of Alberta
 Alberta, Canada
 Continuation-in-part of application Ser. No.
 779,758, Nov. 29, 1968, now abandoned.
 This application Nov. 20, 1970, Ser. No.
 91,487

[54] METHOD OF TRANSPORTING A SUBSTANCE ALONG A PIPELINE
 15 Claims, 8 Drawing Figs.
[52] U.S. Cl. .................................................. 302/2 R,
 243/25, 243/35, 243/38, 302/14
[51] Int. Cl. .................................................. B65g 51/00,
 B65g 51/04
[50] Field of Search ............................ 243/25, 32,
 35, 38, 39; 302/2 R, 14-16

[56] References Cited
UNITED STATES PATENTS
2,016,203 10/1935 Irving ............................ 243/35
2,722,388 11/1955 Zimmerman ................. 243/39 X
3,246,878 4/1966 Hamrick ........................ 243/39 X Primary Examiner—Evon C. Blunk
Assistant Examiner—W. Scott Carson
Attorney—J. R. Hughes ABSTRACT: A substance is transported by a carrier liquid along a pipeline in the form of discrete articles, for example as mouldings or in containers, each having a cylindrical exterior provided with spacing means of uniform thickness extending circumferentially around at least a portion of the leading half of the article to space the leading half from the pipeline internal surface. The spacing means, which is preferably set back from the leading end of the capsule may be a collar or spaced ridges and is provided to tilt the capsule leading end upwardly to reduce the pressure gradient along the article by the article being conveyed along the pipe on a wedge of liquid. The specific gravity of each article together with the collar thereon is between 0.5 and 12.

PATENTED JAN 11 1972

INVENTOR
JAN KRUYER
By J.R.Hughes
AGENT

PATENTED JAN 11 1972

INVENTOR
JAN KRUYER
By J. R. Hughes
AGENT

METHOD OF TRANSPORTING A SUBSTANCE ALONG A PIPELINE

This application is a continuation-in-part of application Ser. No. 779,758, now abandoned.

This invention relates to a method of transporting a substance along a pipeline.

The transportion of materials by pipeline where applicable can be substantially more economical than corresponding transportation by rail or vehicle means, by virtue of simplicity of operation and high degree of automation characteristic of pipeline transportation. This has resulted in extensive applications of pipelining procedures to the movements of gases and liquids such as natural gas and petroleum. These applications, however, are essentially limited to situations in which the substance to be transported is more or less directly amenable to flow in a pipeline.

Coal and gilsonite, for example, can be pipelined in aqueous suspension, but settling rates for high-density powders such as iron and nickel or concentrates in water demand such high turbulence to maintain an aqueous suspension and, therefore, such high velocities, that pressure gradients in suspended solids lines for such materials tend to become undesirably high for long-distance application. These high-pressure gradients demand an unduly high amount of power to pump the aqueous suspension from one end of the pipeline to the other end. Such high-power requirements to pump the aqueous suspension can only be met by providing either an undesirably high number of pumping stations or very large capacity pumping units. In either case the maintenance costs of maintaining the pumping units in working order are undesirably high.

It is an object of the present invention to provide a method of transporting a substance which appreciably reduces the pressure gradient requirements along the pipeline and thus either the number of pumping stations or the power requirements of the pumping stations.

The transportation of solids in suspension may also give rise to other problems such as contamination of the solid by the fluid (for instance, wheat carried in crude oil), difficulty of separation of the solid from the fluid (for instance, finely divided coal from a suspension thereof in water or oil), attrition of the solid during transportation, severe abrasion of the pipe wall, especially in bends and valves, by the solid material and the need to grind the solid to a small particle size.

Various procedures have heretofore been proposed for transporting materials through pipelines as discrete articles. For instance, it has been proposed to enclose materials in containers of metal or the like to make ingots of the material and to move such containers or ingots pneumatically or hydraulically through the pipeline.

Even though the magnitude of the pressure gradient required to maintain the capsule movement along the pipeline is significantly reduced with such proposals it would be highly desirable to reduce it further.

It is another object of the present invention to reduce significantly the magnitude of the pressure gradient along containers or discrete articles of a substance, which is necessary to move the containers or discrete articles along a pipeline.

According to the invention there is provided a method of transporting a substance along a pipeline having a bore substantially uniform in diameter, and which extends from a first location to a second location, comprising pumping a carrier liquid from said first location to said second location and through said pipeline, inserting said substance as a plurality of discrete, elongated articles, each having a substantially cylindrical exterior, successively into said pipeline at said first location for entrainment by said carrier liquid, to form a continuously moving stream flowing from said first location and composed of said carrier liquid with said articles disposed therein in single row distribution, and removing said inserted articles from said pipeline at said second location, and wherein the improvement comprises providing spacing means of substantially uniform thickness along the article and extending in a circumferential direction around at least a portion of the leading half only of which conveyed article said spacing means tilting said front end upwardly from the pipeline internal surface and the specific gravity of each said article together with the spacing means thereon being between 0.5 and 12 of that of the carrier liquid so that each article is carried along the pipeline on a wedge of said carrier liquid.

Preferably each spacing means is set back from the leading front end of the article on which it is disposed.

The spacing means may, for example, comprise an annular collar. The spacing means may also comprise a plurality of ridges disposed side-by-side to extend in a lengthwise direction along the article, each of said ridges being curved to present a smooth exterior to the pipeline internal surface.

Preferably the density of each article together with the spacing means thereon is chosen to lie between 5 to 1 and 0.7 to 1 of that of the carrier liquid. The ratio of the overall dimension of each spacing means relative to that of the cylindrical exterior from which it extends is preferably within the range 1.001 to 1.000 and 1.060 to 1.000. Experiments have shown that a good reduction in the pressure gradient along the pipeline may be obtained when the spacing means is provided with its rear, end at a position between one-quarter and one-half of the length of the article from the leading end thereof.

Where the substance lends itself for the purpose it may be arranged as a plurality of discrete, elongated articles, each having a substantially cylindrical exterior by moulding the substance in a mould. Suitable substances which may be moulded in this matter are sulphur and potash. Other substances may be moulded for this purpose by using a binding medium, for example, comminuted coal or potash may be moulded using water as a binding medium and transported in oil as the liquid. Still another group of substances may be moulded for this purpose by sintering particles of the substance together, this process is suitable for minerals and metal ores such as copper concentrates and iron ore.

In some instances where the articles are moulded the mould cavity may be shaped to the cylindrical exterior and to that of the spacing means to mould them integrally from the substance. This may be done when the substance is, for example, sulphur or potash.

Alternatively, where the substance is unsuitable for forming the spacing means the substance may be moulded to provide the cylindrical exterior of the article alone, and a metal spacing means may be provided thereon. The substance may be unsuitable for forming the spacing means because of its poor abrasion resisting properties, for example, sulphur ingots have poor abrasion resisting properties. Other substances which may be unsuitable for forming the spacing means, are frangible materials which will easily chip and contaminate the carrier liquid.

In other embodiments of the invention the substance may be arranged as a plurality of discrete, elongated articles each having a substantially cylindrical exterior by disposing said substance in a plurality of sealed hollow containers each having the spacing means thereon. This is suitable when, for example, it is undesirable for the substance and carrier liquid to be in contact, for example, it would be undesirable for grain as the substance to contact oil or water as the carrier liquid because of contamination or swelling of the substance by the carrier liquid. In some instances the hollow containers may be moulded, having a substantially cylindrical exterior, integral with said spacing means, from a material selected from the group comprising natural and synthetic plastic materials, each of said hollow containers being filled with the substance, and then sealed. Moulding the containers and spacing means in this manner from a natural plastic material such as natural rubber, or a synthetic plastic material such as polyethylene, provides inexpensive containers having collars, and which are fairly light in weight.

In some instances it may be desirable to mould the hollow container from a natural or synthetic plastic material and provide each container with a metal spacing means. In this instance the metal spacing means may impart some rigidity to the moulded hollow container to maintain the cylindrical surface circular. Alternatively the metal spacing means may be used where it is found that a spacing means having good abrasion resistance is necessary.

In other embodiments the sealed containers and spacing means are both of metal or an alloy. It may be found necessary to use metal or alloy containers and spacing means for example, aluminum or copper containers and spacing means where, for example size makes it impractical to use a cheaper container of a plastic material.

If desired a plurality of hollow containers of solid bodies may be used each having spacing means of a natural or synthetic plastic material. For example, polyolefin plastic spacing means or an aluminum or copper container or solid body may desirably reduce any frictional drag between the spacing means and the pipe inner surface.

In the accompanying drawings which illustrate, by way of example, embodiments of the present invention;

Figure 1:
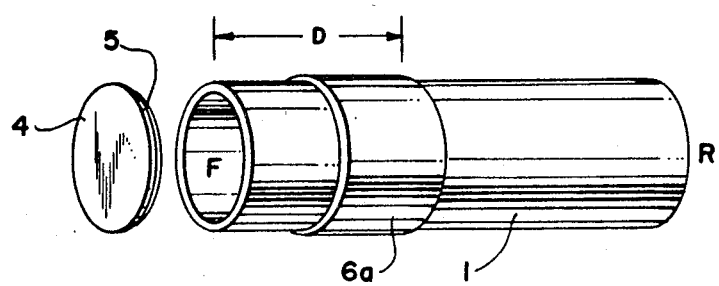
FIG. 1 is a perspective view of a hollow container having spacing means thereon in the form of an annular collar for use in transporting a substance along a pipeline.

In FIG. 1 there is shown a hollow container 1 of metal e.g., aluminum having a cylindrical exterior. The container 1 has an open front end thereof designated 3 whilst the rear end (not shown) is sealed by a rear end wall. A metal cover 4 has an extension 5 which is a press fit in the opening 3 to seal the container 1.

An oversize heat-shrinkable, irradiated polyolefin tube was slid on to the container 1 and both were heated in an oven until the polyolefin tube had shrunk, to form, as a spacing means, a polyolefin annular collar 6a thereon extending circumferentially around the whole of at least a portion of the front or leading half only of the container 1. The collar 6a is of uniform thickness along the container 1 and is set back from the leading end of the container 1.

Figure 2:
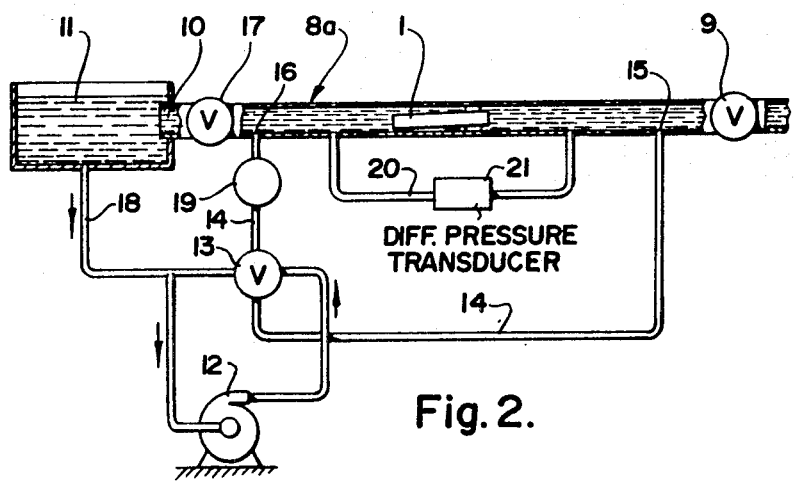
FIG. 2 is a side view of pipeline used to carry out tests on containers provided with spacing means in the form of annular collars.
Figure 4:
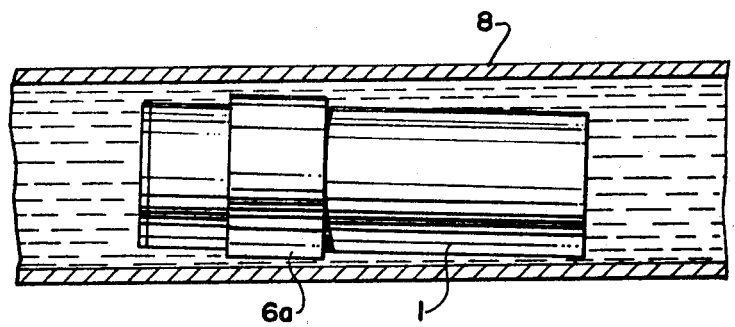
FIG. 4 is an enlarged sectional side view of a portion of the pipeline shown in FIG. 2 with a container passing along it entrained in water.

In laboratory experiments a pipeline 8 as shown in FIG. 2 was provided in order to determine what reductions in the system pressure gradient are achieved using containers provided with collars.

The pipeline comprised a 1.267 inch bore copper tube 8a and the hollow container 1 was 0.888 inch diameter ratio by 12 inches long stainless steel hollow cylinder, which was filled to have a specific gravity of 2.00. Diameter ratio is the external diameter of the hollow container 1 divided by the inside diameter of the pipeline 8.

The copper tube 8a had a valve 9 at one end to trap water within it. The other end 10 of the copper tube 8a extended into a water tank 11 which filled the bore of the copper tube 8a completely with water. A pump 12 connected to a fourway valve 13 was disposed in the pipe 14 for withdrawing water from the copper tube 8a at 15 and delivering it thereto at 16 when the four-way valve was set for flow in the copper tube 8a in the forward direction, or for withdrawing water at 16 from the copper tube 8a delivering it thereto at 15 when the four-way valve was set for flow in the copper tube 8a in the reverse direction. A capsule could be immersed in water in tank 11 and inserted from there into the copper tube 8a through valve 17. The valve 17 was closed after insertion of the capsule and served to maintain the pump pressure within the copper tube 8a and cause flow therein. Pipe 18 was connected between the tank 11 and the suction sides of pump 12 in order to maintain a sufficient supply of water for the pump at all times. A liquid velocity meter 19 was inserted in pipe 14 between the four-way valve and the copper tube 8a in order to measure the velocity of the liquid entering or leaving the copper tube 8a. A further pipe 20 was provided containing a water pressure gauge at 21 for measuring the pressure gradient in the water along the copper tube 8a.

Tests were carried out using the pipeline 8 shown in FIG. 2 and experimental containers of the type shown in FIG. 1.

The collars 6a on the containers 1 were disposed at different positions along the lengths of the containers 1 for different tests with all of the collars 6 disposed at the same position in any one test. For the collars 6a at each position tests were carried out with the water passing along the pipeline 8 at a number of different velocities.

Figure 3:
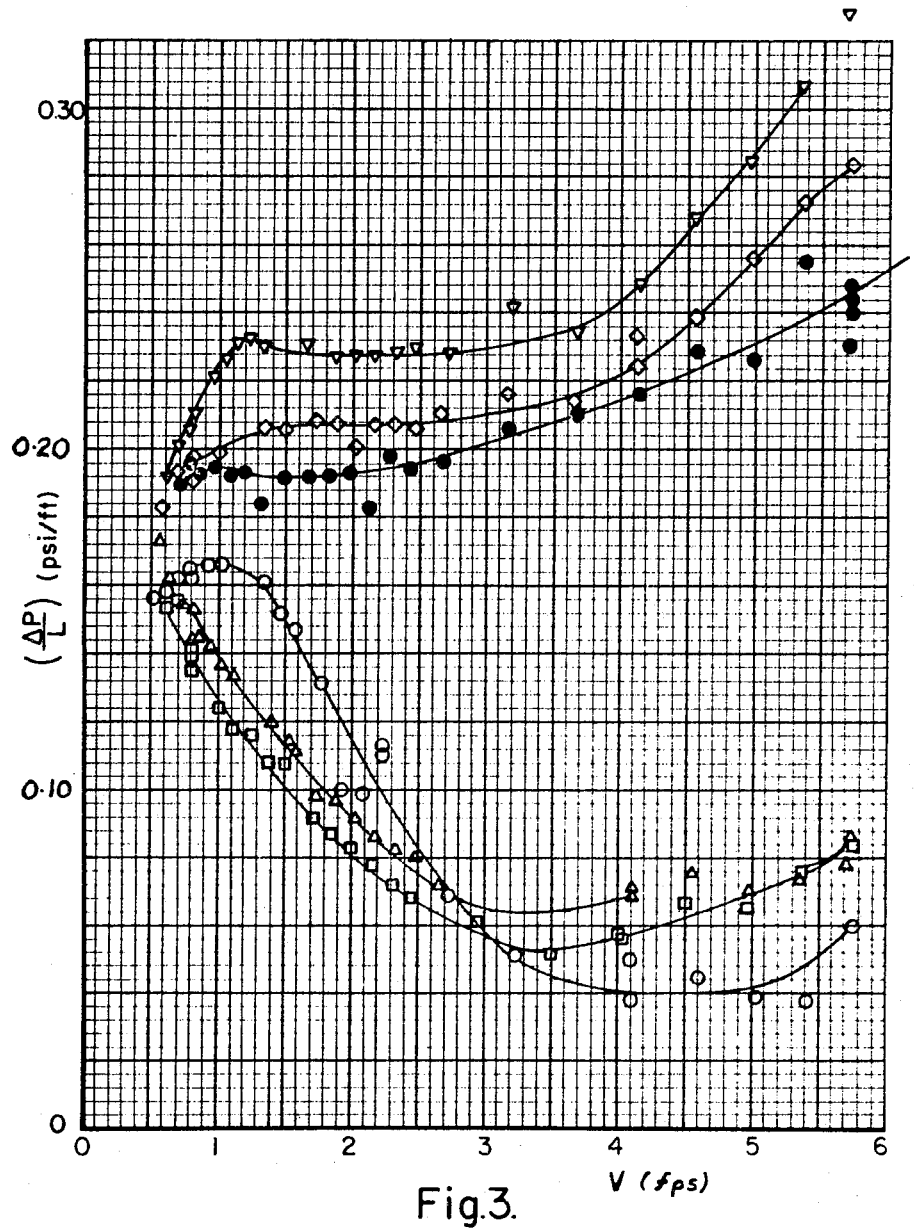
FIG. 3 shows graphs relating to a number of containers used with the collars disposed on them at different positions.

FIG. 3 shows graphs representing results obtained in the tests carried out with the apparatus shown in FIG. 2. In these graphs P/L is the pressure differential along the container 1 in pounds per square inch per unit foot length of the container 1. V is the velocity in feet per second of the water in the pipeline 8 between the positions at which the further pipe 19 is connected thereto.

In these tests the results shown in the graphs are with the collars 6a of two inches in length disposed at distances D (FIG 1), as follows, with $D=1.250$ inches, with $D=3.125$ inches and with $D=6.125$ inches, with $D=11.750$ inches and with $D=12.125$ inches. A further test was carried out with the containers 1 having no collars 6a and these results are designated.

From the graphs it will be seen that with the collar 6a disposed on the trailing half of the container 1 the pressure gradient obtained was higher than that of the container 1 without a collar, whilst with the collar on the leading half only of the container 1 the pressure gradient was lower and decreased as the velocity of the water was increased. The reason for this was found to be that as shown in FIG. 3 the collar 6a on the leading half only of the container 1 tilts the front end of the container 1 upwardly so that the article is carried along the pipeline 8 on a wedge of the water.

It was found that the overall specific gravity of the filled container 1 together with that of the collar 6a should be between 12 to 1 and 0.5 to 1 of that of the water comprising the carrier liquid.

It was further found that the ratio of the diameter of each collar 6a to that of the cylindrical exterior of the container 1 on which it was disposed was preferably within the range 1.001 to 1.000 and 1.060 to 1.000.

With the test it was found that the collar 6a is preferably set back from the leading end, for the best results with its read end at a position (D from the leading end) between one-fourth and one-half of the length of the container from the leading end thereof.

Figure 5:
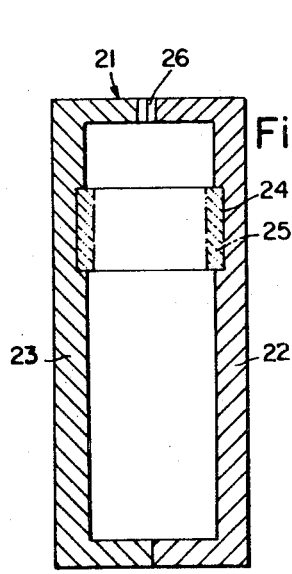
FIG. 5 is a sectional side view of a mould for moulding a cylindrical article and providing a collar thereon.

Referring to FIG. 5, where it is possible for a substance to be moulded a two-part mould 21 may be used, which is split vertically into two parts 22 and 23, to mould the substance to form the cylindrical articles. An annular groove 24 is provided in the mould 21 so that the collar can either be moulded from the substance integral with the cylindrical article, or a collar insert designated 25 (and shown chain-dotted) may be inserted in the mould to be secured to the cylindrical article during the moulding operation. A pouring or injection opening 26 is provided in the mould 21 and the conventional vents or sprue holes may also be provided in the upper end of the mould 21. If desired the annular groove 25 may be omitted from the mould 21 so that a cylindrical article is moulded therein, and the collar may be disposed around the moulded cylindrical article when it has been removed from the mould. Using any of the moulding methods mentioned above a similar mould 21 may be used to sinter sinterable materials to form the cylindrical articles.

Figure 6:
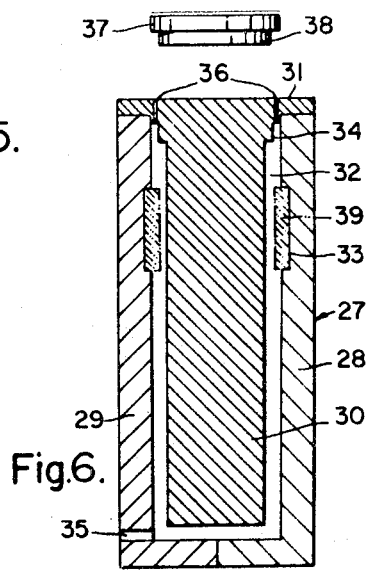
FIG. 6 is a sectional side view for moulding a cylindrical container and providing a collar thereon.

Referring to FIG. 6, there is shown a sectional side view of a mould 27 for moulding a cylindrical container, from a natural synthetic plastic material, which may be filled with a substance. The mould 27 is split about a vertical axis into two parts 28 and 29 and has a core 30 provided with a flange 31 closing the top of the mould cavity 32. A groove 33 is provided in the mould parts 28 and 29 so that the collar may be moulded integrally with the cylindrical container. The core 30 has a stepped portion 34 which provides an annular seating in the open end of the moulded cylindrical container. An injection port 35 is provided at the lower end of the mould 27 for the injection of the natural or synthetic plastic material, and sprue and vent holes 36 are provided at the upper end thereof. A disc 37 of natural or synthetic plastic material is provided to seal the open end of a moulded cylindrical container. Each disc 37 has a locating spigot 38 which locates in the annular seating formed in the cylindrical container by the stepped portion 34. The disc 37 may be sealed to close the opening of a filled cylindrical container by using an adhesive such as an epoxy resin.

If desired each moulded container may be provided with a metal collar by inserting a metal collar 39 (shown chaindotted) in the mould before the cylindrical container is moulded by injecting natural or synthetic plastic material into the mould 27.

Figure 7:
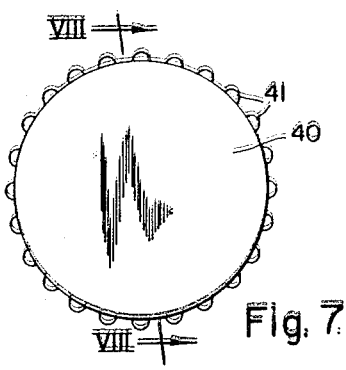
FIG. 7 is an end view of a hollow container having spacing means thereon in the form of ridges.
Figure 8:
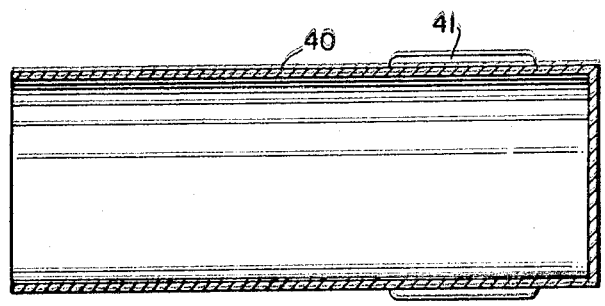
FIG. 8 is a sectional side view along VIII—VIII FIG. 6.

In FIG. 7 and 8 there is shown a hollow cylindrical container 40 of aluminum or brass, which may be sealed by a cover (not shown) similar to the cover 4 (FIG. 1). A plurality of ridges 41 are disposed side-by-side and extend in a lengthwise direction along the container 40. Each of the ridges 41 is curved at 43 to present a smooth exterior to the internal surface of a pipeline.

It will be appreciated that the ridges 41, which may be of the same material as the container 40, may be of another shape such as parts of an annulus. It is important that the ridges are sufficiently closely spaced to space the cylindrical exterior of the casing 40 from the internal surface of a pipeline.

The container 40 with the ridges 41 on it is used in the same manner as the containers 1 of the previous embodiment and may be manufactured in the same manner. If it is necessary for the ridges 41 to be placed around the container 41, this may be done by producing the ridges on a thin annular band.

In other embodiments ridges similar to those designated 41 may be moulded on to a moulded article of the substance to be transported or keyed into it during moulding.

It should be noted that the spacing means in any of the previous embodiments will take most of the wear in, for example, rubbing against the internal surface of the pipeline, thus reducing the wear of the container or moulded article.

The spacing means causes the cylindrical container or moulded article to be lifted off the internal surface of the pipeline, thus giving lower pressure gradients along the cylindrical surface. This reduces frictional drag of the container or moulded article which also results in less wear of the container or moulded article.

If the spacing means is manufactured from a material having a lower coefficient of friction with the internal surfaces of the pipeline than that of the cylindrical surface then this will also reduce the pressure gradient along the cylindrical surface and frictional drag on the container or moulded article.

What is claimed is:

1. A method of transporting a substance along a pipeline having a bore substantially uniform in diameter, and which extends from a first location to a second location, comprising pumping a carrier liquid from said first location to said second location and through said pipeline, inserting said substance as a plurality of discrete, elongated articles, each having a substantially cylindrical exterior, successively into said pipeline at said first location for entrainment by said carrier liquid, to form a continuously moving stream flowing from said first location and composed of said carrier liquid with said articles disposed therein in single row distribution, and removing said inserted articles from said pipeline at said second location, and wherein the improvement comprises providing spacing means of substantially uniform thickness along the article and extending in a circumferential direction around at least a portion of the leading half only of each conveyed article said spacing means tilting said front end upwardly from the pipeline internal surface and the specific gravity of each said article together with the spacing means thereon being between 0.5 and 12 of that of the carrier liquid so that each article is carried along the pipeline on a wedge of said carrier liquid.

2. A method according to claim 1, wherein each spacing means is set back from the leading end of the article on which it is disposed.

3. A method according to claim 1, wherein each said spacing means comprises an annular collar.

4. A method according to claim 1, wherein each said spacing means comprises a plurality of ridges disposed side-by-side and extending in a lengthwise direction along the article on which they are disposed, each of said ridges being curved to present a smooth exterior to the pipeline internal surface.

5. A method according to claim 1, wherein the overall dimension of each said spacing means relative to that of the said cylindrical exterior from which it extends is within the range 1.001 to 1.000 and 1.060 to 1.000.

6. A method according to claim 1, wherein each said spacing means is provided with its rear end at a position between one-quarter and one-half of the length of the article from the leading end thereof.

7. A method according to claim 1, wherein said substance is arranged as a plurality of discrete, elongated articles, each having a substantially cylindrical exterior by moulding the substance in a mould.

8. A method according to claim 1, wherein said substance is arranged as a plurality of discrete, elongated articles, each having a substantially cylindrical exterior and is provided with said spacing means, by moulding the substance in a mould having a mould cavity which is shaped to the cylindrical exterior of the article and to that of the spacing means to mould them integrally from the substance.

9. A method according to claim 1, wherein said substance is of a material having poor abrasion resistance and is arranged as a plurality of discrete, elongated articles, each having a substantially cylindrical exterior by moulding the substance in a mould, and said spacing means is provided therearound during the moulding operation by placing said spacing means manufactured from an abrasion resistant material, in the mould.

10. A method according to claim 1, wherein said substance is arranged as said plurality of discrete, elongated articles, each having a substantially cylindrical exterior by disposing said substance in a plurality of sealed containers having the said spacing means thereon.

11. A method according to claim 1, wherein said substance is arranged as a plurality of discrete, elongated articles, each having a substantially cylindrical exterior by moulding for each of said articles a hollow container having said spacing means integral therewith from a material selected from the group comprising natural and synthetic plastic materials, filling each of said hollow containers with said substance, and sealing each of said containers.

12. A method according to claim 1, wherein said substance is arranged as a plurality of discrete, elongated articles, each having a substantially cylindrical exterior, by moulding for each of said articles a hollow container, from a material, selected from the group comprising natural and synthetic plastic material, each of said containers being provided with said spacing means thereon manufactured from metal, filling each of said containers, and sealing each of said containers.

13. A method according to claim 9, wherein each of said sealed containers and said spacing means are of metal.

14. A method according to claim 1, wherein said substance is arranged as a plurality of discrete, elongated articles, each having a substantially cylindrical exterior, by placing said substance in a plurality of hollow metal containers each having said spacing means thereon of a material selected from the group comprising natural and synthetic plastic materials and sealing each of said containers with said substance therein.

15. A method according to claim 1, wherein said spacing means is provided on each of said articles by heat shrinking on each article an annulus of heat-shrinkable material.

* * * * *